United States Patent
Takada

(10) Patent No.: US 6,571,843 B2
(45) Date of Patent: Jun. 3, 2003

(54) PNEUMATIC TIRE INCLUDING BLOCKS WITH V-SHAPED CORNERS

(75) Inventor: Yoshiyuki Takada, Kobe (JP)

(73) Assignee: Sumitomo Rubber Industries, Ltd., Hyogo-ken (JP)

( * ) Notice: Subject to any disclaimer, the term of this patent is extended or adjusted under 35 U.S.C. 154(b) by 13 days.

(21) Appl. No.: 09/742,099

(22) Filed: Dec. 22, 2000

(65) Prior Publication Data

US 2001/0027835 A1 Oct. 11, 2001

(51) Int. Cl.[7] .......................... B60C 11/11; B60C 11/13; B60C 107/00
(52) U.S. Cl. ............................ 152/209.15; 152/209.24; 152/902
(58) Field of Search ....................... 152/209.15, 209.19, 152/902, 209.24

(56) References Cited

U.S. PATENT DOCUMENTS

| | | | | |
|---|---|---|---|---|
| 2,604,920 A | * | 7/1952 | Kirby | |
| D187,575 S | * | 3/1960 | Cavrette | |
| 3,707,177 A | * | 12/1972 | Boileau | |
| 5,388,625 A | * | 2/1995 | White | |
| 5,417,268 A | * | 5/1995 | Kishi | |
| 5,456,301 A | * | 10/1995 | Wise | |
| 6,000,451 A | * | 12/1999 | Takada | |
| 6,079,464 A | * | 6/2000 | Hatakenaka et al. | |

FOREIGN PATENT DOCUMENTS

| | | | |
|---|---|---|---|
| GB | 1549347 | * | 8/1979 |
| JP | 1-273706 | * | 11/1989 |
| JP | 2-179508 | * | 7/1990 |
| JP | 3-132403 | * | 6/1991 |

* cited by examiner

*Primary Examiner*—Steven D. Maki
(74) *Attorney, Agent, or Firm*—Birch, Stewart, Kolasch & Birch, LLP

(57) ABSTRACT

A pneumatic tire comprises a tread portion provided with blocks, each block provided with circumferentially opening V-shaped corners each defined between two corner walls intersecting each other. In a cross section including the intersecting line K of the two corner walls and a normal line drawn normally to the tread face from a radially outer end of the intersecting line K, the intersecting line K comprising an upper slanting part KU and a lower normal part KL, the upper slanting part KU extending radially inwards from the tread face to a point P1 with an inclination angle $\theta 1$ with respect to said normal line, and the lower normal part KL extending radially inwardly from the point P1 in substantially parallel to the normal line. The depth D1 of the point P1 from the tread face being in a range of from 0.30 to 0.50 times the height H0 of the block.

7 Claims, 5 Drawing Sheets

PNEUMATIC TIRE INCLUDING BLOCKS WITH V-SHAPED CORNERS

BACKGROUND OF THE INVENTION

1. Field of the Invention

The present invention relates to a pneumatic tire, more particularly to an improved tread block structure being capable of improving road grip such as mud and snow grip of the tire and resistance to cracks and tear-off of the block.

2. Description of the Related Art

In heavy duty radial tires for trucks, construction vehicles and the like used on bad roads such as muddy or snowy roads, block patterns are widely used to provide a good road grip.

In the U.S. Pat. No. 6,000,451, such a block pattern is disclosed, wherein, as shown in FIG. 1, center blocks (Bc) which highly contribute to the traction, are provided on or near the tire equator with circumferentially opening V-shaped corners (J) instead of a circumferentially pointed outward corner. Such corners (J) make it possible to grip snowy and muddy roads effectively, whereby superior road grip such as traction and braking can be obtained. (Therefore, this pattern is also employed in the following embodiment of the present invention.)

In the center blocks (Bc), however, the rigidity decreases near the corners (J), and the deformation becomes larger near the corners than other part. As a result, from the middle stage to the last stage of the tread wear life, cracks are liable to occur at the corners (J), and in the worst cases, blocks (Bc) are torn off and the tread reinforcing belt is exposed. As a result, damages to the tire such as cord corrosion and cord rupture which make it impossible to retread the tire are caused.

SUMMARY OF THE INVENTION

It is therefore, an object of the present invention to provide a pneumatic tire having tread blocks provided with corners in which cracks starting from the corners are decreased to prevent the blocks from tearing off, without deteriorating the road grip.

According to the present invention, a pneumatic tire comprises a tread portion provided with blocks, each block provided with circumferentially opening V-shaped corners each defined between two corner walls intersecting each other, in a cross section including the intersecting line K of the two corner walls and a normal line drawn normally to the tread face from a radially outer end of the intersecting line K, the intersecting line K comprising an upper slanting part KU and a lower normal part KL, the upper slanting part KU extending radially inwards from the tread face to a point P1 with an inclination angle θ1 with respect to said normal line, and the lower normal part KL extending radially inwardly from the point P1 in substantially parallel to the normal line, and the depth D1 of the point P1 from the tread face being in a range of from 0.30 to 0.50 times the height H0 of the block.

DESCRIPTION OF THE PREFERRED EMBODIMENT

An embodiment of the present invention will now be described in detail in conjunction with the accompanying drawings.

According to the present invention, a pneumatic tire comprises a tread portion 2, a pair of sidewall portions, a pair of bead portions, a carcass extending between the bead portions, and a belt disposed radially outside the carcass in the tread portion as usual.

In this example, the tire 1 is a mud and snow radial tire having a 11R24.5 size for heavy duty vehicles. Thus, the tread portion 2 is provided with deep tread grooves 3 having a depth D0 of from 22 to 27 mm. The ratio of the total actual ground contacting area of the tread portion to the gross area of tread portion is decreased to about 50% to improve road grip under snow and mud conditions.

According to the invention, the tread portion 2 is provided with blocks B each having circumferentially opening V-shaped corners J. The V-shaped corner J is formed in a circumferentially protruding part 4 and/or the tip of a circumferentially tapering part 4 of the block B.

Figure 2:
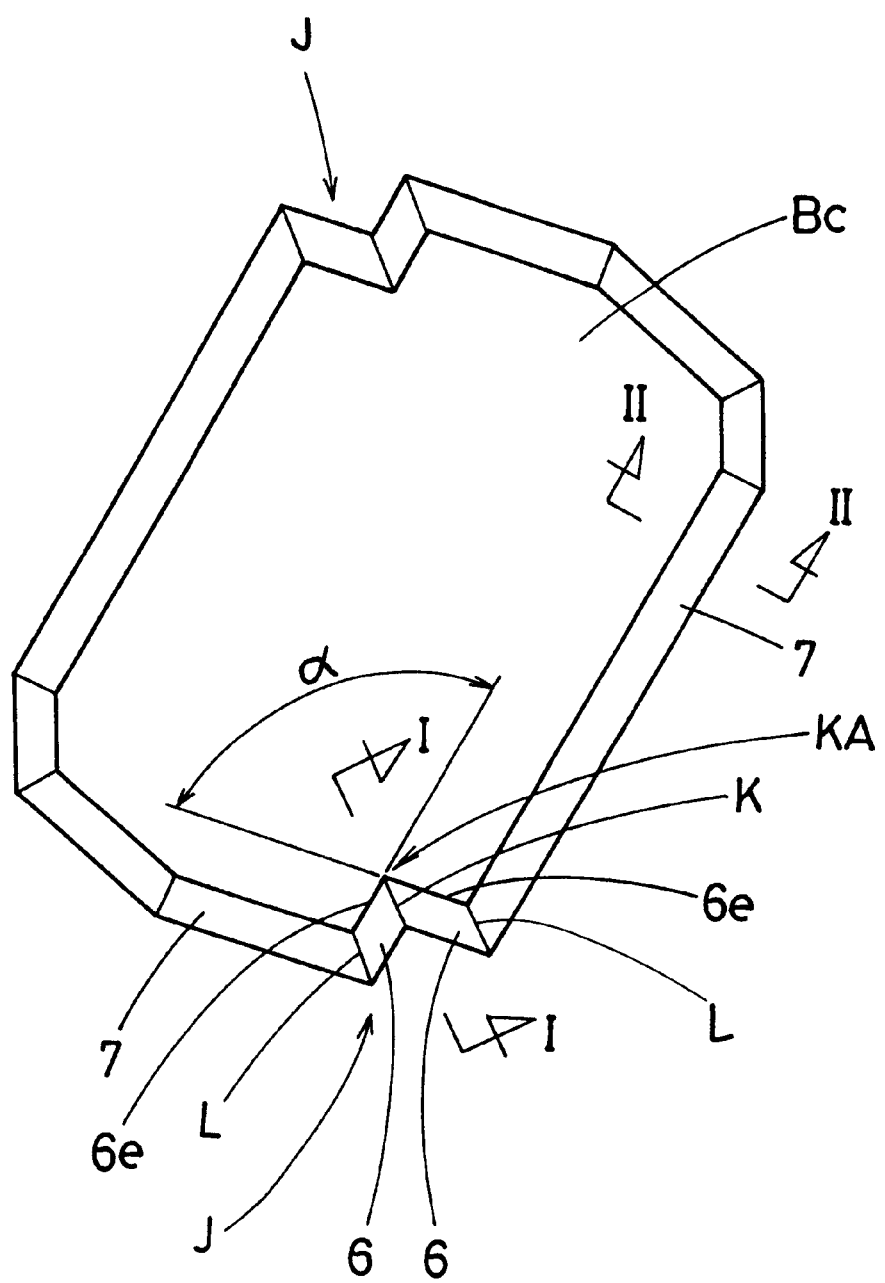
FIG. 2 is an enlarged plan view of a block thereof.

The corner J is formed between two walls 6 (hereinafter the "corner wall") which intersect each other at an angle a of from 80 to 120 degrees as shown in FIG. 2, while forming an intersecting line K.

It is preferable that the corners J are formed in the vicinity of the tire equator C such that the axial distance between the tire equator C and the point of intersection KA of the corner walls 6 at the tread face 2F is in the range of not more than 10% of the tread width TW.

In this example, the blocks B having corners J are formed as center blocks Bc which are disposed on the tire equator C in a circumferential row. In addition, a circumferential row of middle blocks Bm and a circumferential row of outer blocks Bo are disposed on each side of the center block row.

The blocks B and blocks Bc, Bm and Bo may be formed in various shapes such as rectangle, square, parallelogram and the like.

Figure 1:
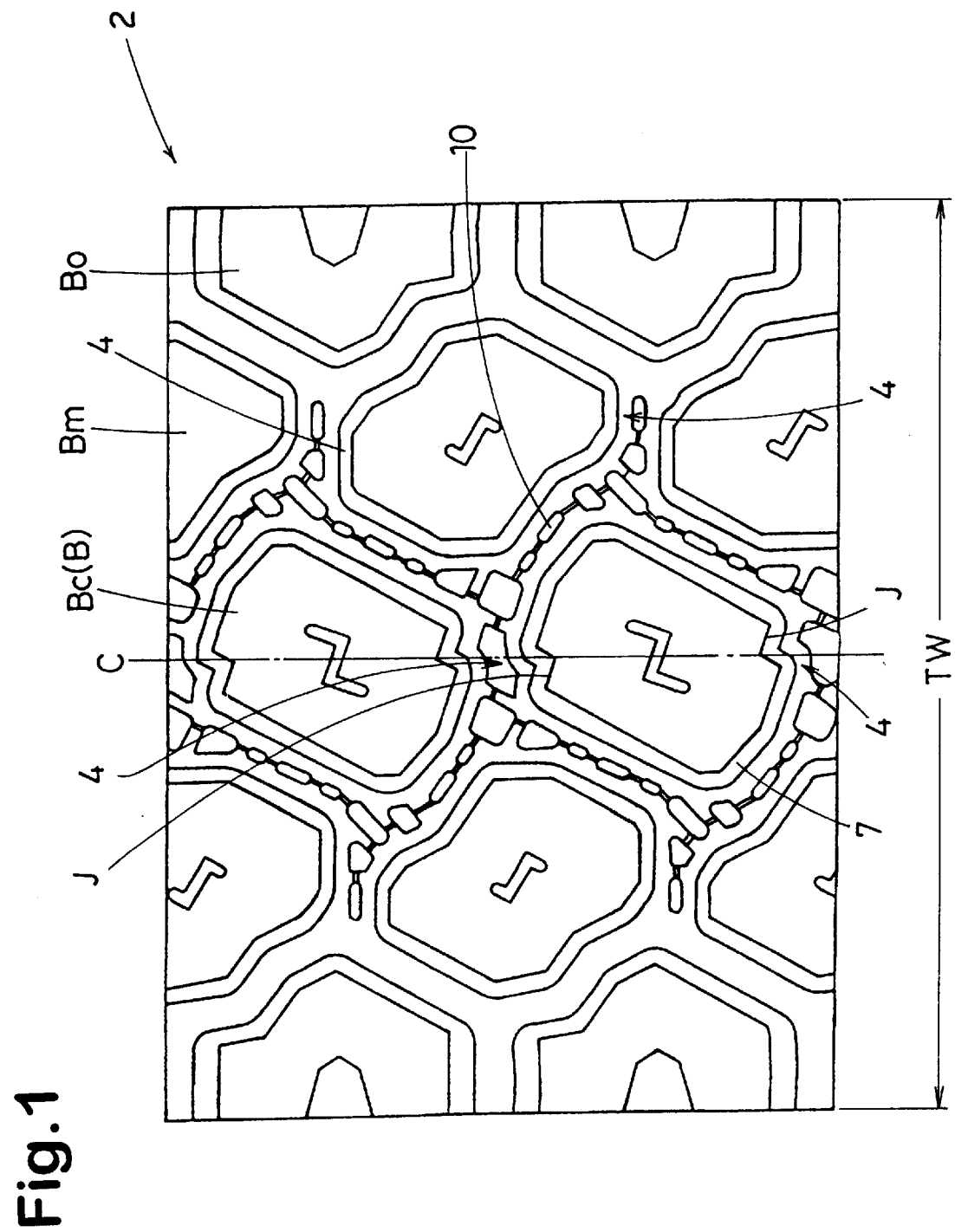
FIG. 1 shows an example of the tread pattern of a tire according to the present invention.

The tread pattern shown in FIG. 1 is very similar to the tread pattern used in my invention disclosed in U.S. Pat. No. 6,000,451. Therefore, reference should be made. In short, the tread grooves 3 surrounding the center blocks Bc are provided therein with projections 10 for preventing stone trapping. The projection 10 comprises alternate wide main portions and narrow coupler portions.

Figure 3:
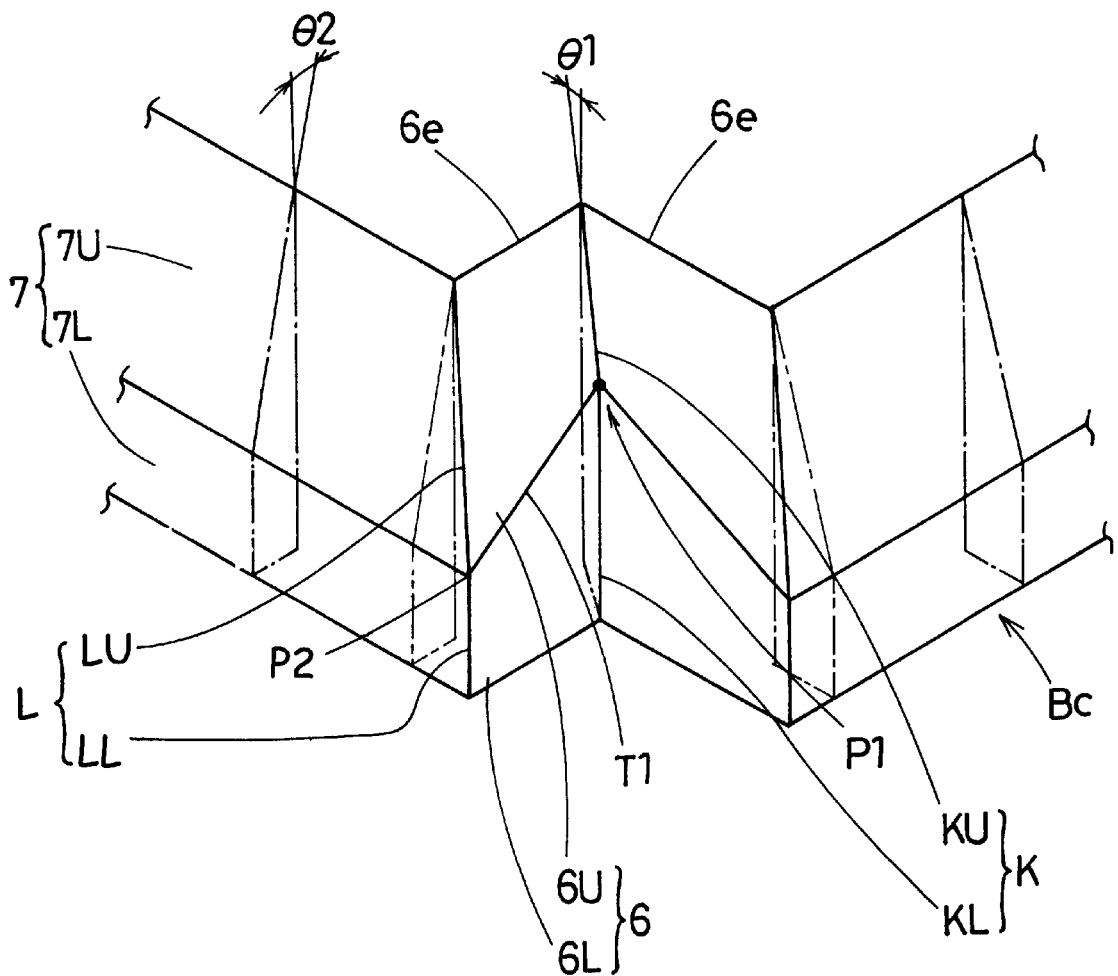
FIG. 3 is an enlarged perspective showing a V-shaped corner thereof.

The above-mentioned circumferentially protruding or tapering part 4 of the block B is formed between two walls 7 as shown in FIGS. 2 and 3. Each of the walls 7 comprises an upper slanting part 7U and a lower normal part 7L. The intersecting line T2 between the upper slanting part 7U and lower normal part 7L extends at a constant depth D2 from the tread face. The depth D2 is set in a range of from 0.5 to 0.85 times the height H0 of the block B or the maximum depth of the adjacent tread groove 3. Preferably, the depth D2 is not less than 0.6 times, more preferably not less than 0.7 times the height H0.

Figure 4:
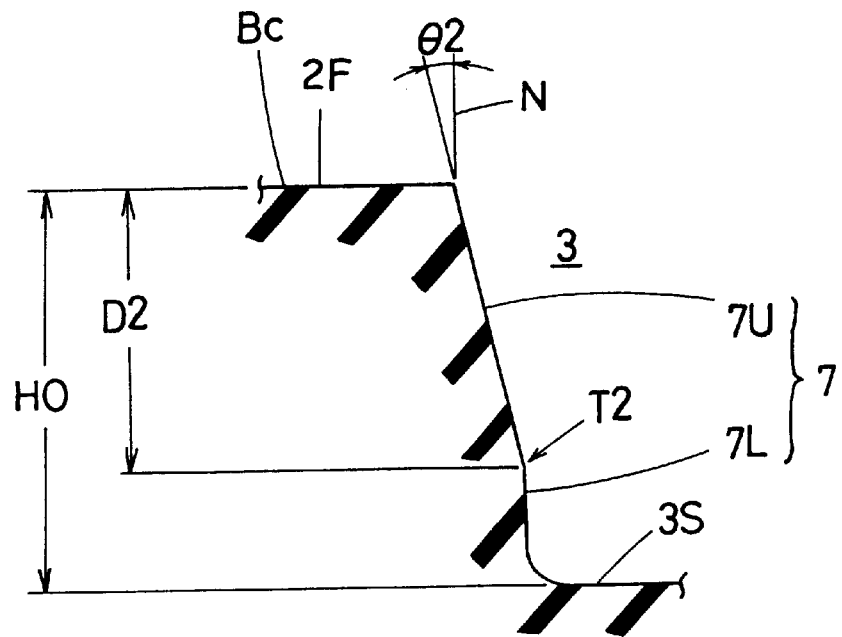
FIG. 4 is a cross-sectional view taken along ling II—II of FIG. 2.

In FIG. 4, the upper slanting part 7U extends radially inwardly from the tread face 2F to the intersecting line T2 while inclining at an angle θ2 with respect to the normal direction N to the tread face 2F. The angle θ2 is set in the range of from 5 to 18 degrees. The lower normal part 7 extends from the intersecting line T2 towards the groove bottom 3S in substantially perpendicular the tread face 2F. FIG. 4 shows a cross section being normal to the lower normal part 7L and tread face 2F.

Each of the walls 7 intersects the adjacent corner wall 6 forming an edge or an intersecting line L.

Each of the corner walls 6 comprising an upper slanting part 6U and a lower normal part 6L. The intersecting line Ti therebetween meets the above-mentioned intersecting line T2 on the intersecting line L. The depth of the intersecting line T1 from the tread face 2F gradually decreases from the line L to the line K as shown in FIG. 3. The lower normal part 6L is a substantially flat face perpendicular to the tread face 2F.

Figure 5:
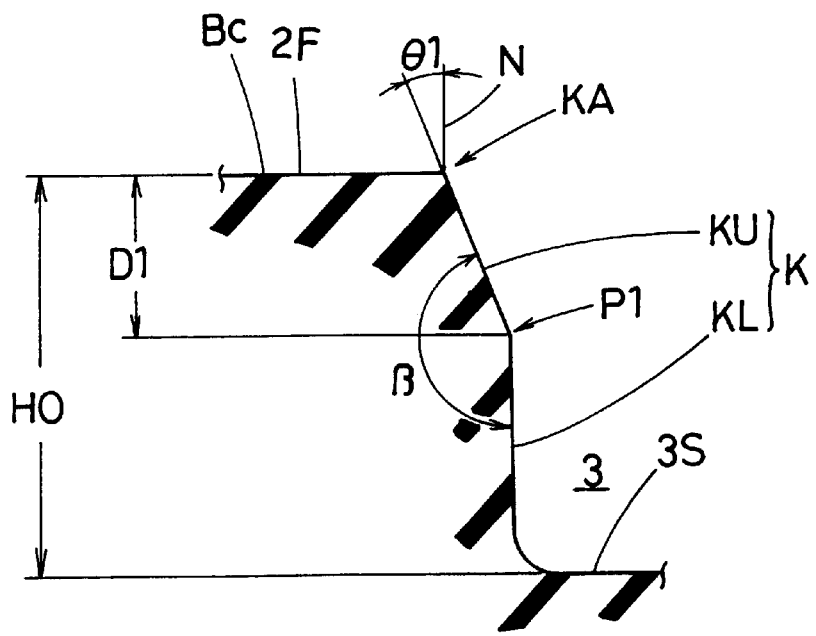
FIG. 5 is a cross-sectional view taken along line I—I of FIG. 2.

FIG. 5 shows a cross-section including the intersecting line K and a straight line N drawn normal to the tread face from the intersection KA which is the radially outer end of the intersecting line K. In this cross section, the intersecting line K is made up of an upper slanting part KU and a lower normal part KL, wherein the upper slanting part KU extends radially inwards from the tread face 2F to a point P1 while inclining at an angle θ1 with respect to the normal line N, and the lower normal part KL extends from the point P1 toward a groove bottom 3S in substantially parallel to the normal line N.

The point P1 or bent point is formed at a depth D1 of from 0.30 to 0.50 times the above-mentioned height H0, from the tread face 2F. The angle θ1 is set in the range of 13 to 35 degrees, preferably 18 to 25 degrees.

The intersecting line T1 is a substantially straight line extending obliquely from the depth D2 on the line L to the depth D1 on the line K. The upper slanting part KU of the line K is a substantially straight line extending from the tread face 2F to the depth D1. An edge line or intersecting line 6e between the tread face 2 and corner wall 6 is a substantially straight line. The upper part LU of the line L is a substantially straight line. These four lines define the above-mentioned upper slanting part 6U of the corner wall 6 as a substantially flat plane or a slightly twisted plane.

If the depth D1 is less than 0.3 times the height H0, the road grip decreases. If the depth D1 is more than 0.5 times H0, the damage-suppressing effect tends to decrease. If less than 13 degrees, the damage-suppressing effect tends to decrease. If more than 35 degrees, the road grip tends to decrease.

Comparison Tests

Test tires of size 11R24.5 having the tread pattern shown in FIG. 1 were made and tested for the road grip and damages.

The results of the tests and the block specifications are shown in Table 1.

1) Road Grip Test

Running a lumber-carrying vehicle (2-DD-44 wheel type trailer) provided on the driving wheels with test tires, on a compressed snow road, the hill-climbing ability was evaluated into three ranks as follows.

A: Capable of easily climbing with chains attached to one driving axle
B: Capable of climbing with chains attached to one driving axle
C: Capable of climbing with chains attached to both driving axles Test conditions
  Inclination of slope: about 6 degrees
  Atmospheric temperature: −15 degrees C.
  Snow temperature: about −10 degrees C.

2) Damage Test

The lumber-carrying vehicles were actually driven in mountain areas from December (winter) to July (summer), wherein the travelling ratio of on-road and off-road was 50%/50%. Then, the number of damages occurring in the center blocks was counted while classifying the damages in accordance with the degrees thereof. And the rate of the retreadable tires was calculated.

TABLE 1

Figure 6:
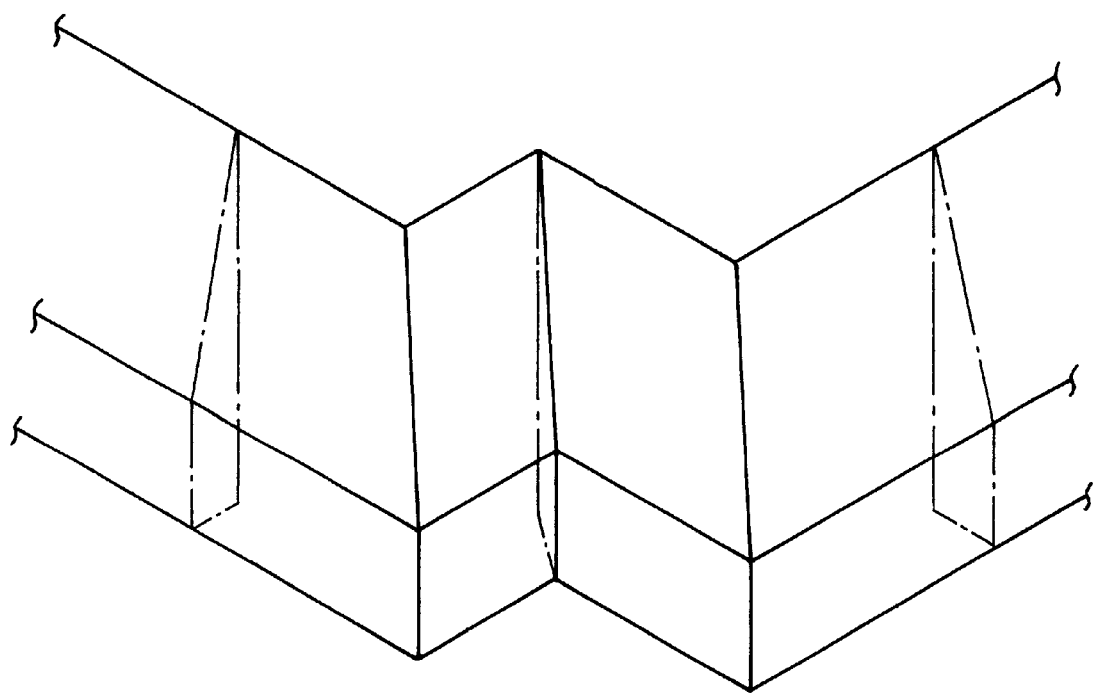
FIG. 6 is an enlarged perspective view showing a corner used in comparison tests as a reference example.

| Tire | Ref. 1 | Ref. 2 | Ref. 3 | Ex. 1 | Ex. 2 | Ref. 4 |
| --- | --- | --- | --- | --- | --- | --- |
| Corner | FIG. 6 | FIG. 3 | FIG. 3 | FIG. 3 | FIG. 3 | FIG. 3 |
| D1/H0 | 0.77 | 0.63 | 0.51 | 0.43 | 0.35 | 0.27 |
| H0 (mm) | 25.5 | 25.5 | 25.5 | 25.5 | 25.5 | 25.5 |
| D1 (mm) | 19.5 | 16 | 13 | 11 | 9 | 7 |
| D2 (mm) | 19.5 | 19.5 | 19.5 | 19.5 | 19.5 | 19.5 |
| θ1 (deg) | 11.2 | 13.6 | 16.5 | 19.3 | 23.2 | 28.8 |
| θ2 (deg) | 11.2 | 11.2 | 11.2 | 11.2 | 11.2 | 11.2 |
| Road grip | A to B | A to B | A to B | B | B | B to C |
| Damage |  |  |  |  |  |  |
| tear-off | 10 | 8 | 3 | 0 | 0 | 1 |
| crack | 22 | 20 | 10 | 5 | 3 | 5 |
| Retreadable-tire rate | 37.5% (3/8) | 50% (4/8) | 75% (6/8) | 87.5% (7/8) | 100% (8/8) | 100% (8/8) |

As shown in the Table, it was confirmed that, in the tires according to the present invention, the tearing-off of the blocks was effectively prevented while maintaining a superior road grip.

What is claimed is:

1. A pneumatic tire comprising
a tread portion provided with blocks,
each said block provided with circumferentially opening v-shaped corners each defined between two corner walls intersecting each other,
in a cross section including an intersecting line K of said two corner walls and a normal line drawn normally to the tread face from a radially outer end of the intersecting line K, the intersecting line K comprising an upper slanting part KU and a lower normal part KL, the upper slanting part KU extending radially inwards from the tread face to a point P1 with an inclination angle θ1 with respect to said normal line, and the lower normal part KL extending radially inwardly from the point P1 in substantially parallel to said normal line, and
a depth D1 of said point P1 from the tread face being in a range from 0.30 to 0.50 times a height H0 of the block, wherein
each of the said two corner walls of each of the corners comprises an upper slanting part 6U and a lower normal part 6L which intersect each other defining an intersecting line T1, and the intersecting line T1 extends from the point P1 to a point P2 on an opposite edge L obliquely inclining radially inwards.

2. The pneumatic tire according to claim 1, wherein said circumferentially opening V-shaped corners are formed in a tip of a circumferentially tapering part of the block and/or a circumferentially protruding part of the block.

3. The pneumatic tire according to claim 1, wherein the lower normal part 6L is a substantially flat face which is substantially perpendicular to the tread face.

4. The pneumatic tire according to claim 3,
wherein the block having second walls each intersecting one of the corner walls along the opposite edge L thereof,
  each said second wall comprising an upper slanting part and a lower normal part which intersect each other defining an intersecting line T2,
  the intersecting line T2 extending from the point P2 on the opposite edge L at the depth D2 deeper than a depth D1 of the point P1,
  the upper slanting part inclined at an angle $\theta2$ of from 5 to 18 degrees with respect to the normal direction to the tread face, and
  the lower normal part inclined at substantially zero degrees with respect to the normal direction to the tread face.

5. The pneumatic tire according to claim 4, wherein the depth D2 is not less than 0.6 times the height H0 of the block.

6. the pneumatic tire according to claim 1, wherein the height H0 is in the range from 22 to 27 mm, and the inclination angle $\theta1$ is in the range of from 13 to 35 degrees.

7. The pneumatic tire according to claim 1, wherein
  each said circumferentially opening V-shaped corner is formed in the vicinity of the tire equator.

\* \* \* \* \*

UNITED STATES PATENT AND TRADEMARK OFFICE
CERTIFICATE OF CORRECTION

PATENT NO. : 6,571,843 B2
DATED : June 3, 2003
INVENTOR(S) : Yoshiyuki Takada

It is certified that error appears in the above-identified patent and that said Letters Patent is hereby corrected as shown below:

<u>Title page,</u>
Insert item:
-- [30]  Foreign Application Priority Data
December 24, 1999     (JP)    11-367897 --

Signed and Sealed this

Second Day of March, 2004

JON W. DUDAS
*Acting Director of the United States Patent and Trademark Office*